(12) United States Patent
Charikar et al.

(10) Patent No.: US 9,495,390 B2
(45) Date of Patent: Nov. 15, 2016

(54) FORMAT IDENTIFICATION FOR FRAGMENTED IMAGE DATA

(71) Applicant: EMC Corporation, Hopkinton, MA (US)

(72) Inventors: Moses Charikar, Princeton, NJ (US); Deepa Ramakrishna, Princeton, NJ (US)

(73) Assignee: EMC Corporation, Hopkinton, MA (US)

( * ) Notice: Subject to any disclaimer, the term of this patent is extended or adjusted under 35 U.S.C. 154(b) by 340 days.

(21) Appl. No.: 13/931,993

(22) Filed: Jun. 30, 2013

(65) Prior Publication Data

US 2014/0059091 A1   Feb. 27, 2014

Related U.S. Application Data

(60) Provisional application No. 61/691,737, filed on Aug. 21, 2012, provisional application No. 61/691,740, filed on Aug. 21, 2012.

(51) Int. Cl.
*G06F 17/30* (2006.01)
*G06F 17/00* (2006.01)

(52) U.S. Cl.
CPC ..... *G06F 17/3028* (2013.01); *G06F 17/30153* (2013.01); *G06F 17/30271* (2013.01)

(58) Field of Classification Search
CPC ............. H04N 19/46; H04N 13/0029; H04N 13/0048; H04N 19/60; H04N 19/93; H04N 5/232; H04N 19/40; H04N 19/48; H04N 19/59; H04N 19/70; H04N 21/8153; H04N 21/8455; H04N 21/85406; H04N 2213/007; H04N 19/12; H04N 19/61; H04N 13/0022; H04N 13/0066

USPC .................................. 707/899; 382/100, 239
IPC ........................ G06F 17/30,17/00; H04N 21/23
See application file for complete search history.

(56) References Cited

U.S. PATENT DOCUMENTS

| | | |
|---|---|---|
| 5,990,810 A | 11/1999 | Williams |
| 6,370,273 B1 | 4/2002 | Kuo |
| 6,526,174 B1 | 2/2003 | Graffagnino |
| 7,106,908 B2 * | 9/2006 | Ridge ............................ 382/239 |
| 7,272,602 B2 | 9/2007 | Moulton |
| 2003/0156652 A1 | 8/2003 | Wise et al. |
| 2005/0069170 A1 | 3/2005 | Alasia et al. |
| 2008/0152231 A1 * | 6/2008 | Gokturk et al. .............. 382/209 |
| 2009/0077252 A1 | 3/2009 | Abdo et al. |
| 2010/0306412 A1 | 12/2010 | Therrien et al. |
| 2010/0321217 A1 | 12/2010 | Koratagere |

FOREIGN PATENT DOCUMENTS

WO   9713372   4/1997

* cited by examiner

*Primary Examiner* — Yicun Wu
(74) *Attorney, Agent, or Firm* — Blakely, Sokoloff, Taylor & Zafman LLP

(57) ABSTRACT

Format identification for fragmented data is disclosed. In some embodiments, an input stream of information that is divided into fragments is received. Fragments are determined and a data format for each fragment is found based on continuity properties including by: determining a physical to canonical layout transformation, determining a tuple size, and partitioning bit positions in tuples into disjoint groups wherein each group corresponds to a channel. The stream of information is compressed using a compression technique selected based on the data format, and the compressed stream is stored.

24 Claims, 14 Drawing Sheets

FORMAT IDENTIFICATION FOR FRAGMENTED IMAGE DATA

CROSS REFERENCE TO OTHER APPLICATIONS

This application claims priority to U.S. Provisional Patent Application No. 61/691,737 entitled FORMAT IDENTIFICATION FOR FRAGMENTED BYTE ALIGNED INTEGER IMAGE DATA filed Aug. 21, 2012, which is incorporated herein by reference for all purposes; and U.S. Provisional Patent Application No. 61/691,740 entitled FORMAT IDENTIFICATION FOR FRAGMENTED BYTE NON-ALIGNED INTEGER IMAGE DATA filed Aug. 21, 2012, which is incorporated herein by reference for all purposes.

BACKGROUND OF THE INVENTION

In many applications, data fragments or packets of different formats are typically processed in the same manner. Such indiscriminate processing may not be efficient or optimal.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Format Identification (Byte-Aligned)

Techniques for identifying the data format of a fragment of a byte-aligned integer image/sensor data independent of the header or the rest of the image/sensor data are described herein. In various embodiments, it is determined whether input data comprises a sequence of numeric values (or groups of values) with continuity properties. In some embodiments, each value comprises an integer whose representation takes an integer number of bytes (i.e., 1, 2, 3, 4, or k bytes for a small integer k).

Representation Format

In some embodiments, the input data comprises a concatenation of homogeneous pieces of image data, which are sometimes referred to herein as "segments" or "fragments". For example, the input data may comprise segments from one or more image files having one or more formats.

Figure 1:
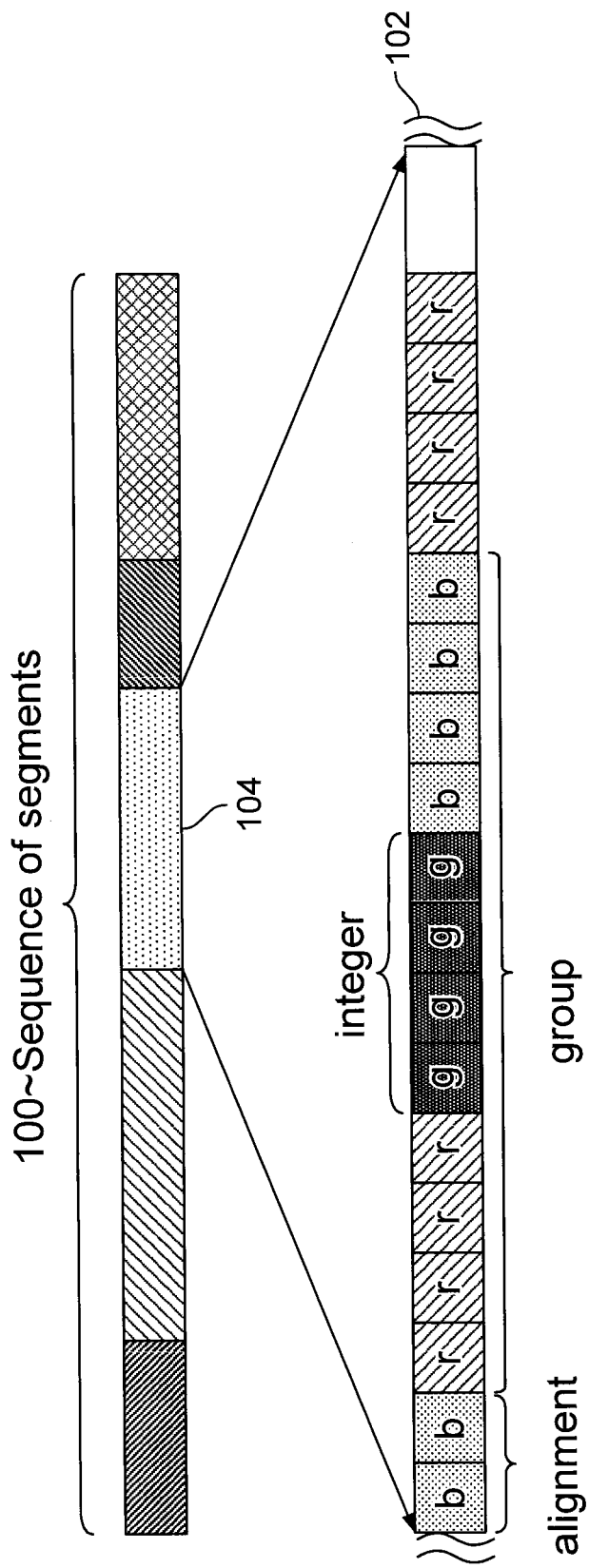
FIG. 1 illustrates an embodiment of a data structure of input data.

FIG. 1 illustrates an embodiment of a data structure of input data. As depicted, input data 100 comprises a sequence of segments. Exploded view 102 illustrates the format of segment 104. For segment 104, integer representation size (k) is four bytes, group size (t) is three integers (i.e., twelve bytes), and alignment (a) is two bytes.

In some embodiments, the lengths of segments are not known a priori, and the (approximate) breakpoints between segments are to be determined. In some embodiments, the data in each segment comprises a sequence of integer values where each such value is represented using a small number of bytes (i.e., 1, 2, 3, 4, or k bytes for a small integer k). In the example of FIG. 1, segment 104 comprises red (r), green (g), and blue (b) channels, and each channel is represented by an integer value. In some embodiments, the representation size, i.e., the number of bytes used to represent each value, is constant throughout each segment but may vary across segments. In some embodiments, the representation of the first complete k byte integer may begin at byte 1, 2, . . . , k of the segment, i.e., the segment boundary may not coincide with the beginning of a set of k consecutive bytes used to represent a single integer value. In various embodiments, the starting position of the first complete k byte integer in the segment is referred to as the "alignment" (a).

Furthermore, the sequence of integer values may be organized into groups of consecutive values. The number of values in each group is a small integer t. For example, where a segment comprises red, green, and blue channels, each group includes the three integer values corresponding to the respective red, green, and blue channels. In some embodiments, the group size is constant across a segment but could vary across segments. For each position i=1, ..., t in the group, it is assumed that the subsequence comprising values in position i in each group exhibits continuity properties. In other words, it is expected that consecutive values in any such subsequence are close. In the example where each group includes the three integer values corresponding to the respective red, green, and blue channels, it is expected that the red integer values from consecutive groups are close, that the green integer values from consecutive groups are close, and that the blue integer values from consecutive groups are close.

Figure 2:
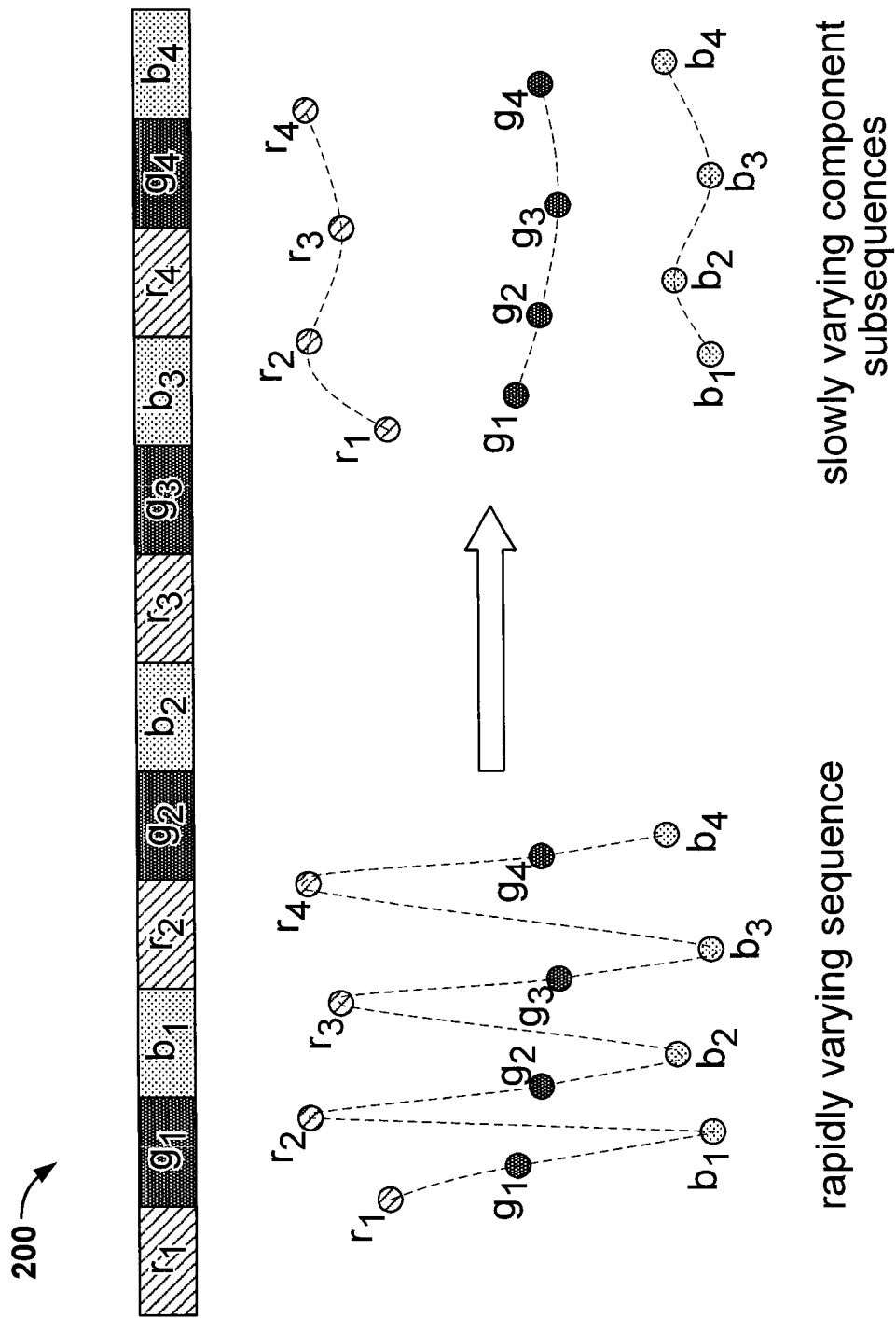
FIG. 2 illustrates an embodiment of continuity properties of a sequence.

FIG. 2 illustrates an embodiment of continuity properties of a sequence. As depicted in FIG. 2, sequence 200 of red, green, and blue integer values comprises a rapidly varying sequence comprised of slowly varying component subsequences comprising each channel.

In various embodiments, goals of the format identification process include (approximately) identifying the breakpoints between segments as well as identifying, for each segment, the integer representation size (i.e., the number of bytes k used for each integer), the alignment a, and the group size t.

Measurement of Continuity Properties

In various embodiments, during the measurement of continuity properties stage, the continuity properties of the given input data are examined, and a determination is made of how well the input data fits a particular format, such as the aforementioned format comprising k-byte integer values in groups of t values. Note that this is done without having yet determined the segment boundaries and alignment. In fact, the measurement of continuity properties from this stage will be used to drive the determination of segment boundaries and alignment. In this stage, multiple positions in the given input data (e.g., positions at every s bytes for parameter s) are examined. For each such position, the bytes in the local neighborhood of that position are examined, and based on this a "fitting penalty" is assigned to every choice of (k,t,a) considered, where k is the integer representation size, t is the group size, and a is the alignment, which may be represented by an integer with possible values 1, 2, ..., k. In various embodiments, the (k,t,a) tuple is referred to as the "format identifier".

Consider the following example technique for assigning fitting penalties, wherein continuity properties are measured at position i, with representation size k, and group size t. Let $v_{k,t}(i)$ be a t dimensional vector whose coordinates are the values of integers represented by the k consecutive bytes starting in positions i, i+k, i+2k, i+(t−1)k. For j taking values in 0, ..., k−1, compare the vectors $v_{k,t}(i+j)$ and $v_{k,t}(i+j+kt)$. The fitting penalty for this choice of k, t, and a=(i+j)mod k is a suitably chosen function of these vectors $v_{k,t}(i+j)$ and $v_{k,t}(i+j+kt)$. An ideal fitting penalty function is one whose value is lowest for the correct choice of k and t (i.e., when the values of k and t match the actual representation size and group size for the data) and when j is such that position i+j corresponds to the start of a k byte window representing an integer value. Note that this also means that positions i+j+k, i+j+2k, ..., i+j+(t−1)k correspond to the start of k byte windows representing successive integer values in the sequence, since each integer has a k byte representation. Thus, for this choice of k, t, and j, the coordinates of vector $v_{k,t}(i+j)$ are simply t consecutive integer values in the sequence, and the coordinates of $v_{k,t}(i+j+kt)$ are the next t integer values in the sequence.

Figure 3:
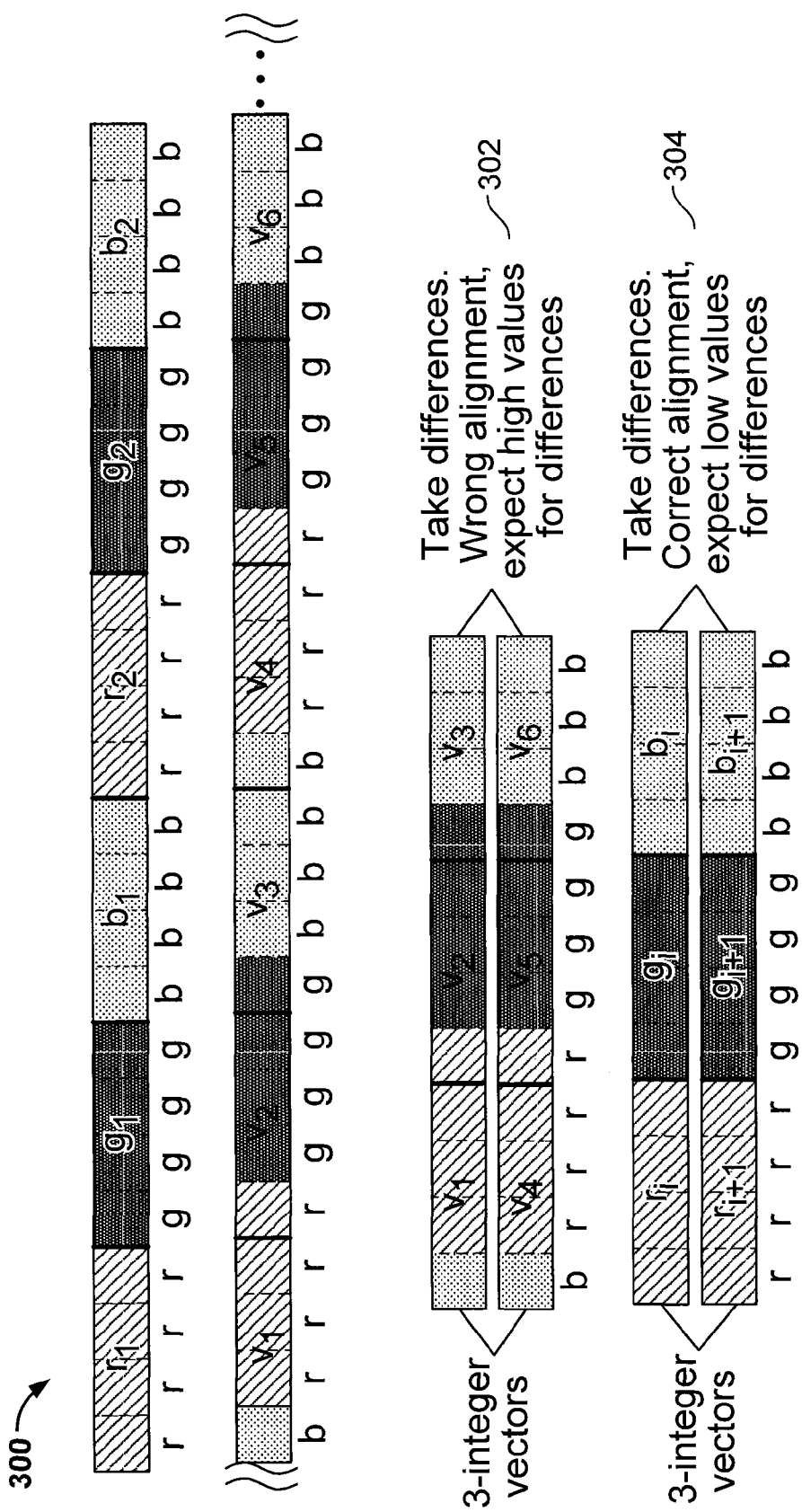
FIG. 3 illustrates an embodiment of computing fitting penalties.

FIG. 3 illustrates an embodiment of computing fitting penalties. Specifically, FIG. 3 intuitively shows why the correct alignment would yield the lowest values of the fitting penalty. In the given example, segment 300 comprises red (r), green (g), and blue (b) channels, where the integer representation size k is four bytes and group size t is three integers (i.e., twelve bytes). As shown, where the alignment 302 is wrong, the difference between consecutive red integer values (as presented by vectors $v_1$ and $v_4$) is high, the difference between consecutive green integer values (as presented by vectors $v_2$ and $v_5$) is high, and the difference between consecutive blue integer values (as presented by vectors $v_3$ and $v_6$) is high. However, where the alignment 304 is correct, the difference between consecutive red integer values (as presented by vectors $r_1$ and $r_{i+1}$) is low, the difference between consecutive green integer values (as presented by vectors $g_i$ and $g_{i+j}$) is low, and the difference between consecutive blue integer values (as presented by vectors $b_i$ and $b_{i+1}$) is low.

In various embodiments, any appropriate fitting penalty function may be employed with respect to the scheme described above. One example of a fitting penalty function is next described. This fitting penalty function approximates the average number of bits per byte of the input required to encode the differences between corresponding values in consecutive groups. For a position i and a particular choice of k, t, and j, let u(r) denote the rth coordinate of $v_{k,t}(i+j)$ and let v(r) denote the rth coordinate of $v_{k,t}(i+j+kt)$. An example fitting penalty function is $(\Sigma_{r=1}^{t} \log_2(|u(r)-v(r)|))/(tk)$.

Algorithm to Determine Representation Format and Boundaries Between Segments

The fitting penalty function computed at various locations in the input gives information about the likely values for the representation length k, the group size t, and alignment a at each sampled point. As described, the correct format identifier (k,t,a) for any point is likely to have a low fitting penalty assigned to it. However, in some embodiments, this point-wise information may be noisy and incorrect at a few locations (e.g., due to noise in the data itself, the presence of a header field in the data, etc.). In order to make a high confidence assessment of the correct format identifier for a contiguous piece of the data and determine segment boundaries, in some embodiments, the following two principles are used.

First, the correct format identifier (k,t,a) for a contiguous piece of the data is expected to consistently have a low average fitting penalty for a large number of consecutive sample points. It is a reasonable assumption that the tuple with the minimum score over a large number of sample points is indeed the correct tuple for those samples. Correspondingly, for a large interval, if no format identifier achieves a low fitting penalty (e.g., as measured by an appropriately chosen threshold), it can be concluded that the data in that interval is not a smoothly varying sequence of integer values.

Second, the boundary between consecutive segments whose corresponding format identifiers differ can be detected by detecting a change in the (k, t,a) tuple achieving the long term minimum average score. Note that this will not detect boundaries between consecutive segments whose corresponding format identifiers are identical. For certain purposes such as compression, distinction between such consecutive segments is not required. For purposes where it is important to identify such segment boundaries, this can be done in two phases: first identifying segment boundaries where the corresponding format identifiers change and then identifying further breakpoints within each "segment" identified by the first phase. This second phase can be executed by computing appropriately chosen statistical properties of the sequence of values and detecting changes in these statistical properties. Examples of such statistical properties include measures of the variance of differences in corresponding values of consecutive groups or a histogram of variances with t buckets, one for each group position.

There are several ways in which the aforementioned two principles can be applied to determine segment boundaries and assign format identifiers to each segment. One example technique demonstrating the use of these principles is next described. The input to this procedure is a sequence of positions in the input data i=1, 2, . . . , m. For each such position i, for every format identifier (k,t,a) considered, the fitting penalty is denoted s(i,(k,t,a)) where low values indicate a good fit. The goal of the procedure is to assign a format identifier label f(i) to every position i=1, 2, . . . , m where f(i) is a (k,t,a) tuple. In order to do this, an objective function is defined which assigns a numeric value to every assignment f(i) of format identifier labels to positions. The assignment output by this procedure will be the one that minimizes this objective function. The cost function uses a scale parameter C and is defined as follows:

$$\Sigma_{i=1}^{m} s(i,f(i)) + C\Sigma_{i=1}^{m-1} \Delta(f(i),f(i+1))$$

where $\alpha(f(i), f(i+1))$ is 1 if $f(i) \neq f(i+1)$ and 0 if $f(i)=f(i+1)$

The cost function penalizes changes in the assignment of format identifiers to consecutive positions, favoring the assignment of the same format identifier to a contiguous set of positions. At the same time, assigning format identifier f(i) to position i adds a contribution of s(i,f(i)) to the cost function. This favors assignments with low fitting penalties (i.e., good fits), enforcing the property that the assignment of format identifiers must adapt to the data characteristics. The assignment of format identifiers to positions that minimizes this cost function may be easily found via any dynamic programming algorithm.

Techniques for identifying the data format of a fragment of a byte-aligned integer image/sensor data have thus far been described. Techniques for identifying the data format of a fragment of a non (or not necessarily) byte-aligned integer image/sensor data without relying on the header or the rest of the image/sensor data are described henceforth. Although some of the given examples are described with respect to a data fragment, the described identification techniques may also apply to the concatenation of several such data fragments.

Format Identification (Byte Non-Aligned)

Overview

At a high level, the described format identification techniques examine the structure of the input data and automatically identify the data format by exploiting the natural repetitive structure of uncompressed sensor and image data. In the process of doing this, the input data is partitioned into one or more fragments, where each fragment has a homogenous structure. In some embodiments, each such fragment is converted into one or more sequences of numeric values (and a small amount of additional information) such that the combination of the sequence(s) of numeric values and additional information may be used to reconstruct the fragment. In some embodiments, the number of sequences used as well as the rules used to produce the sequence(s) depend on the structure of a particular fragment.

Data Model

The data model is a description of the structure of the input data. In some embodiments, a flexible model that can fit a variety of uncompressed image formats, sensor data formats, and inputs that may be a concatenation of data from different formats is used. In some embodiments, the process of analyzing the structure of the input is accomplished by fitting a data model to the input data.

One example of a data model is next described. The input data comprises a concatenation of fragments. For example, each fragment may comprise a portion of an image data. For each fragment, the distinction between the physical layout of bits on disk and canonical layout of bits is made. The canonical layout has a repetitive structure. In some embodiments, this repetitive structure is important for automatic format identification. In some embodiments, this canonical layout of bits can be obtained from the physical layout by a suitable local transformation (i.e., rearrangement) of the bits in the physical layout. For example, the physical layout may be divided into four byte chunks, and the bits in each chunk may be suitably reordered to obtain the canonical layout. In some embodiments, this transformation from physical to canonical layout is determined by the endianness of the storage format (little-endian byte order vs. big-endian byte order) and the word size, but there may exist other factors that influence the transformation.

Figure 4:
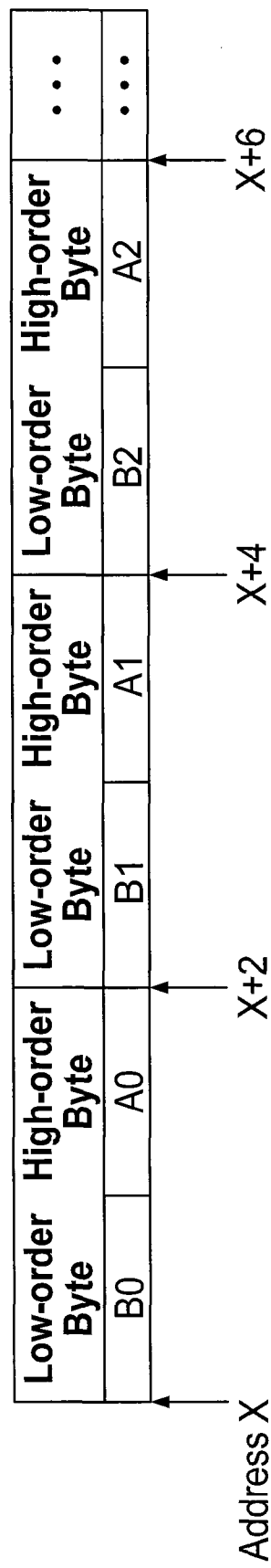
FIGS. 4A-4B illustrate embodiments of the little endian and big endian formats.

FIGS. 4A-4B illustrate embodiments of the little endian and big endian formats. Specifically depicted in each of FIGS. 4A and 4B is the physical or logical layout of two-byte integer sequence A0B0, A1B1, A2B2. FIG. 4A illustrates an example of the big-endian format. In the big-endian format, the high-order byte is stored first, and so it appears at the left side of each two-byte integer. FIG. 4B illustrates an example of the little-endian format. In the little-endian format, the low-order byte is stored first, and so it appears at the left side of each two-byte integer.

The structure of the canonical layout of a fragment is next described. In some embodiments, each fragment comprises a concatenation of homogenous structures that comprise fixed width tuples of t bits (the tuple size t is a parameter) where the first and last tuple may be only partially present. In some embodiments, a tuple refers to a group of one or more channels or dimensions. For example, each channel may represent a different color (e.g., red, green, and blue). In some embodiments, a partially present tuple may include fewer than all the bits corresponding to the channels of a tuple (e.g., due to the manner in which the fragment was generated). In some embodiments, a subset of bit positions in each tuple is allocated to the representation of a particular channel. These bit positions allocated to a channel are generally, but not necessarily, contiguous. In some embodiments, for each tuple, the number of bits allocated to each channel is assumed to be the same. In some embodiments, the representation format of each channel is assumed to be an unsigned integer.

Figure 5:
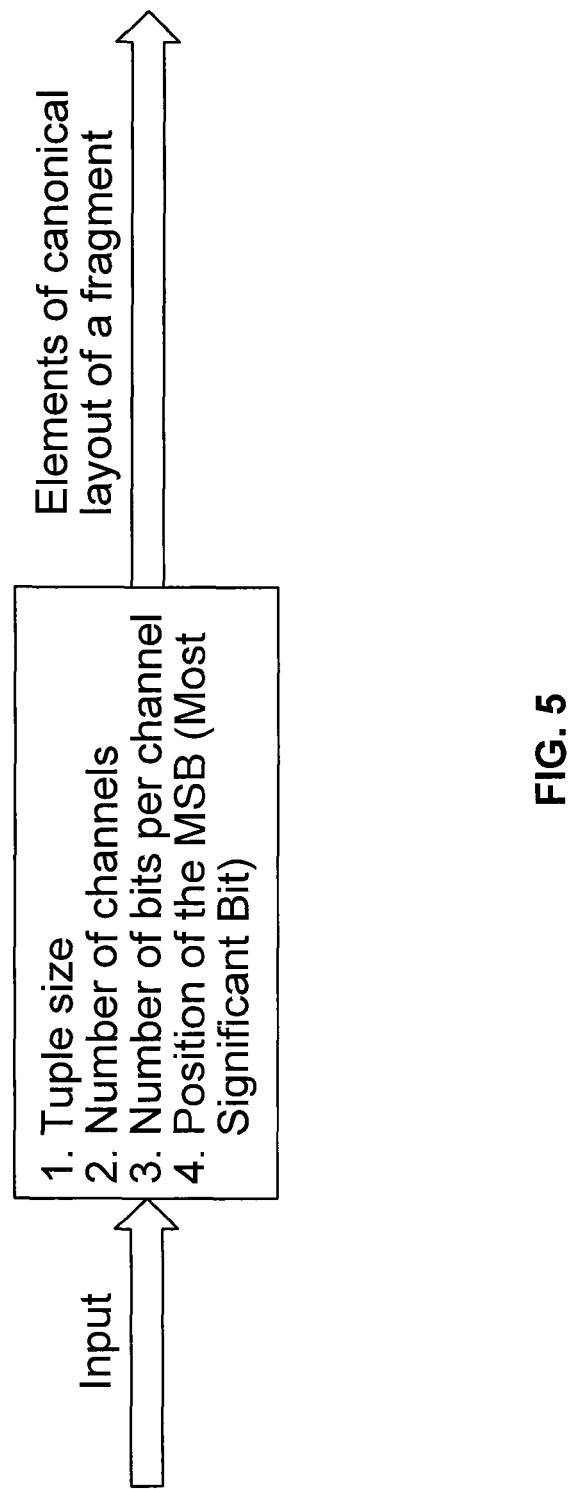
FIG. 5 illustrates an embodiment of the various elements comprising the canonical layout of a fragment.

FIG. 5 illustrates an embodiment of the various elements comprising the canonical layout of a fragment. As depicted, the set of elements includes tuple size, number of channels, number of bits per channel, and/or position of the MSB (most significant bit).

In various embodiments, when the underlying data has continuity properties, this manifests itself as the following:

there exist subsets of bit positions within the tuple such that the bits at these positions in consecutive tuples are highly correlated (e.g., the differences between bits at these positions in consecutive tuples are small). A particular case of this general property is the property that the Hamming distance between two consecutive tuples is small (this corresponds to correlations for subsets of size=1, i.e., individual bit positions).

Figure 6:
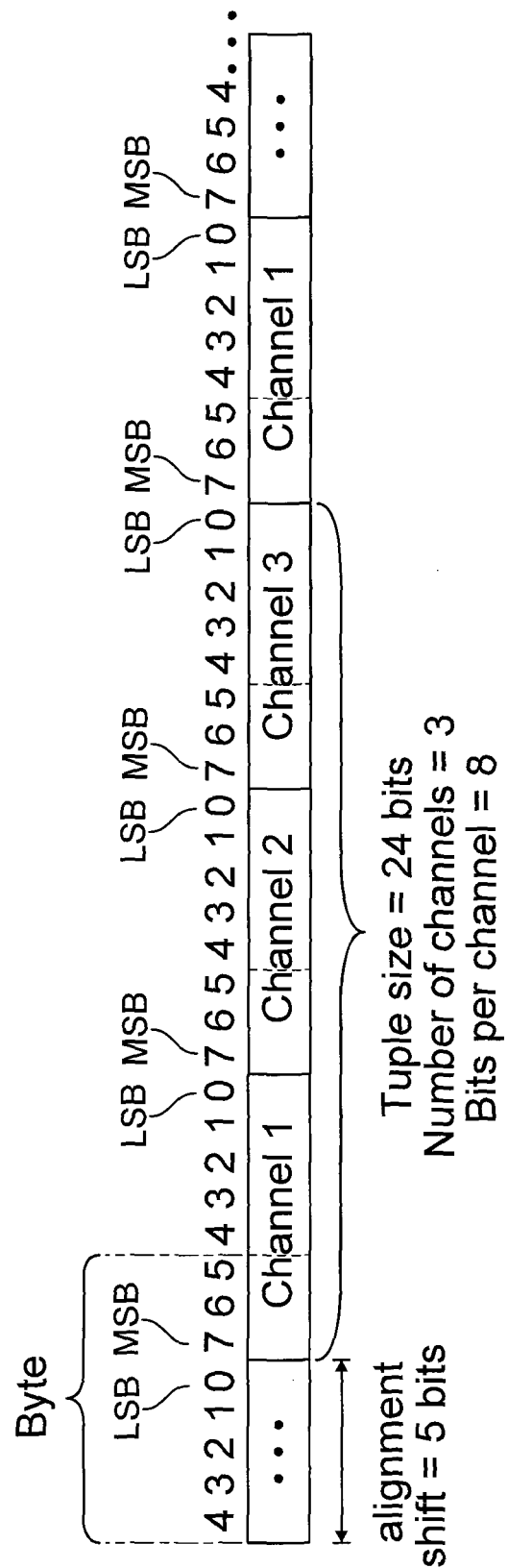
FIG. 6 illustrates various features of an embodiment of a data model for an input image fragment.

FIG. 6 illustrates various features of an embodiment of a data model for an input image fragment. As depicted, the data model comprises a three-channel data format where each channel is a byte (i.e., 8 bits) in length.

Data Model Fitting—Overview

In various embodiments, fitting a data model to input data includes partitioning the input data into fragments and determining a model that best fits each fragment. Note that the fragment boundaries are not known a priori, so the fragment boundaries need to be determined as part of the model fitting process. In some embodiments, the outputs of the model fitting process include the automatically identified formats for the partitioned fragments and the best fitting model for each of them.

An outline of performing model fitting is next described. The input data is divided into windows of a fixed size of L bytes (L is a parameter). In some embodiments, successive windows may be disjoint or overlapping. The window size L is chosen to be large enough so that each window comprises several tuples and small enough so that most windows fall completely inside a fragment as will be discussed later. For each window, the following two steps are performed.

First, the physical to canonical layout transformation (henceforth called "layout transform") and a tuple size t that best fits the data in the window are determined. For example, a layout transform and a tuple size t such that the bits in successive tuples are correlated are determined. This step is further described in detail below.

Second, bit positions in a tuple are partitioned into disjoint groups, where each group corresponds to a channel. Here, statistics of individual bit positions (and possibly larger subsets of positions) are used. In general, bit positions that vary the least are plausible candidates for MSB (most significant bit) positions in the eventual assignment of bit positions to channels. This step is also further described in detail below.

In various embodiments, the tuple size t for windows that are entirely contained inside a fragment can be successfully determined. For those windows that straddle two fragments, the data fitting process will find a low confidence fit, and such windows will be referred to as "unknown". In some embodiments, the window size L is chosen to be small enough so that a large fraction of windows are contained entirely inside a fragment and are hence expected to have homogenous properties that will be detected. At the same time, L should be chosen to be large enough so that there is enough data to accurately compute statistics of individual bit positions (and subsets of bits) that are needed to obtain a partitioning of the bits in each tuple into channels.

In some embodiments, once the data format is successively inferred for most windows, extrapolation is then performed for the remaining unknown windows. In some embodiments, the data format refers to three components: layout transform, tuple size, and partitioning into channels. For example, suppose a window of an unknown format is surrounded by two windows of different formats. Then, it is inferred that the unknown window crosses a fragment boundary, comprising partly of data in one format and partly in another. The best break point within the unknown window is then determined to transition from one format to another. Finally, in some embodiments, consecutive windows and/or portions of windows with the same format are combined into a single inferred fragment.

Data Model Fitting—Layout Transform and Tuple Size

In this process, an individual window is examined and several combinations of layout transforms and tuple sizes are tried so as to find combinations that result in correlations between the contents of successive tuples oft bits in the canonical layout.

In order to determine whether there are correlations between successive tuples, in some embodiments, subsets of bit positions within the tuple such that the contents of these positions in consecutive tuples are highly correlated are determined. In other words, for a subset of s bit positions, the corresponding bits in two consecutive tuples are examined, and it is determined whether the joint distribution of the 2s bits is far from being uniformly distributed over the $2^{2s}$ possibilities. Descriptions of some simple special cases of such correlation tests based on examining all subsets of size 1 are provided next.

For bit position i, let $p_i$ denote the fraction of times the bit in position i is different for two consecutive tuples. Then $$\sum_{i=1}^{t} p_i$$

represents the average Hamming distance between the bits in consecutive tuples. Note that if the contents of consecutive tuples are uncorrelated, each $p_i$ is expected to be close to ½ and $$\sum_{i=1}^{t} p_i$$

is expected to be close to t/2. On the other hand, the presence of some $p_i$ close to 0 indicates correlation between consecutive tuples. Thus, for example $$\sum_{i=1}^{t} |p_i - 0.5| \text{ or } \sum_{i=1}^{t} \log\left(\frac{1}{p_i}\right)$$

could be used as a measure of correlation (i.e., high values indicate correlation), or more generally $$\sum_{i=1}^{t} f(p_i)$$

could be used, where f( ) is an appropriately chosen function. Note that the measure of correlation needs to be normalized (e.g., divided by t) in order to compare across different tuple sizes.

Figure 7:
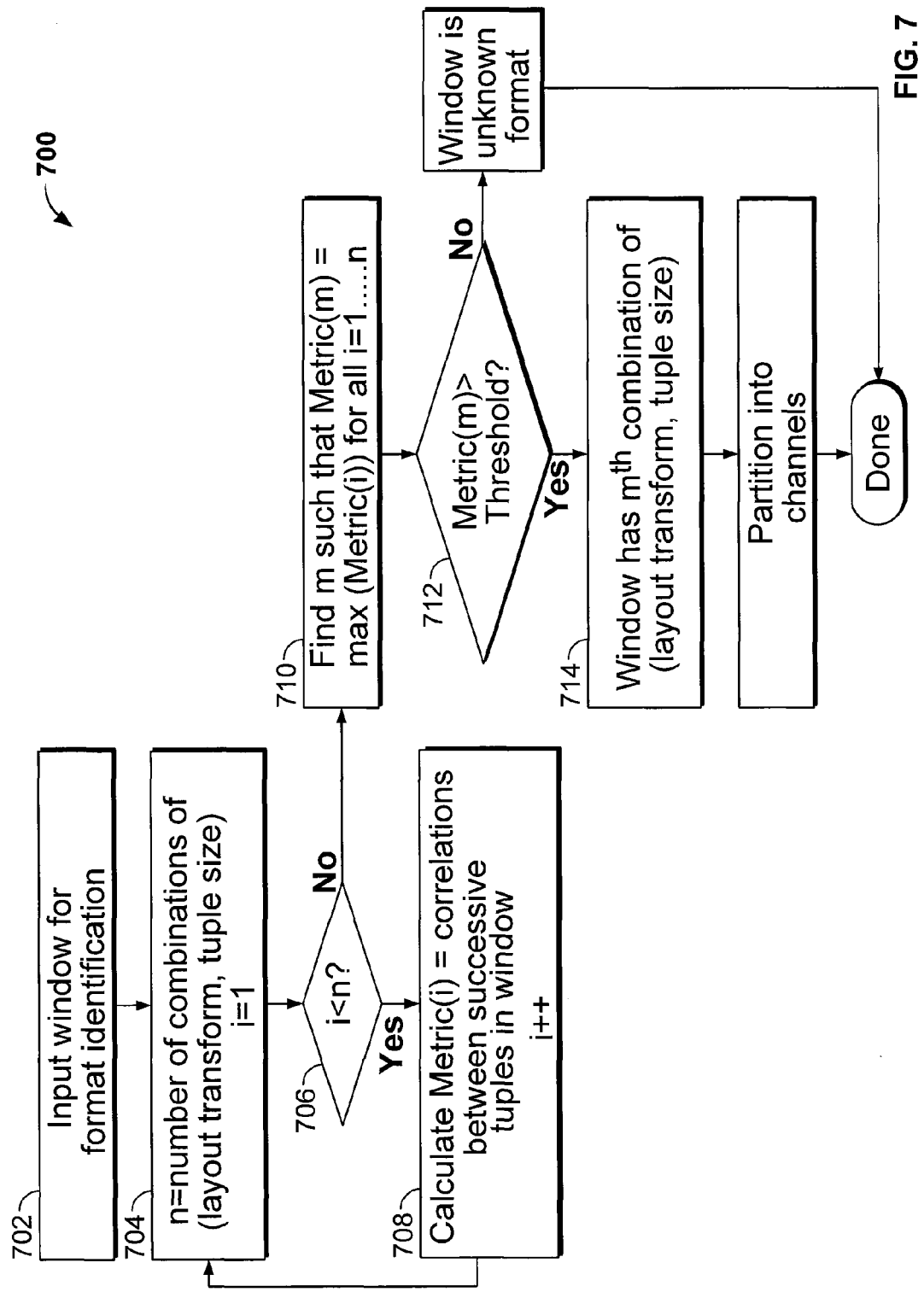
FIG. 7 illustrates an embodiment of a process for full format identification of a window.

In various embodiments, the layout transform and tuple size that give the highest correlation as measured by a scoring function are selected. FIG. 7 illustrates an embodiment of a process for full format identification of a window. In process 700 of FIG. 7, correlations between successive tuples of an input window are computed for each (layout transform, tuple size) combination in steps 702-708, and the $m^{th}$ combination that gives the highest correlation and satisfies a minimum threshold is selected at steps 710-714.

In some embodiments, the value of the scoring function is employed as a confidence measure. For example, a high score indicates that a good fit was found for the current window, and a low score indicates that the model fitting did not succeed. As previously mentioned, a window with a low score is sometimes referred to as an unknown window. In some embodiments, a low score could be indicative of one of two possibilities. One possibility is that the window has a transition between two fragments (and hence two different formats) or has an alignment change. In either case, such a window may be later revisited to determine the transition point between the two fragments. A second possibility is that the window contains data that is not uncompressed image or sensor data. When such a window is revisited, identification of a good transition point may not be accomplished. Hence, such a window may be labeled as one that does not contain image or sensor data.

Data Model Fitting—Partitioning into Channels

In some embodiments, in the partition into channels process, statistics of individual bit positions within a tuple (and possibly larger subsets of positions) are used to partition the bit positions into disjoint groups, where each group corresponds to a channel. In general, bit positions that vary the least are plausible candidates for MSB (most significant bit) positions in the eventual assignment of bit positions to channels. The MSB positions within consecutive tuples are assumed to vary the least because it is assumed that consecutive tuples include repetitive structure.

One example family of schemes to be used to perform such a partitioning process is next described. In this family of schemes, restriction is made to grouping consecutive bits into a single channel (although more general partitioning schemes may not restrict themselves in this way). As used in the previous example, let $p_i (1 \le i \le t)$ denote the fraction of times the bit in position i is different for two consecutive windows. Consider the sequence of $p_i$ values as a circular sequence, i.e., $p_{t+i} \triangleq p_i$. Significant drops in the sequence of $p_i$ values as measured by large values of $p_i/p_{i+1}$ (or $\log(p_i/p_{i+1})$) are detected. Large values for this measure are taken to be breakpoints for channels. In this case, position i+1 is taken to be the MSB for a channel starting at bit position i+1 onwards. The division into channels is done by identifying all such breakpoints and treating the contiguous bit positions in between breakpoints as a channel.

Data Model Fitting—Optimizations

In some embodiments, for increased efficiency, sampling is used to gather statistics on the data within a window for the purpose of determining the layout transform, tuple size, and channel partitioning. In determining the data format (layout transform, tuple size, and channel partitioning) for a window, a common case is that the format matches the one determined for the previous window. Another possibility is that the format is the same, but the alignment has shifted.

Figure 8:
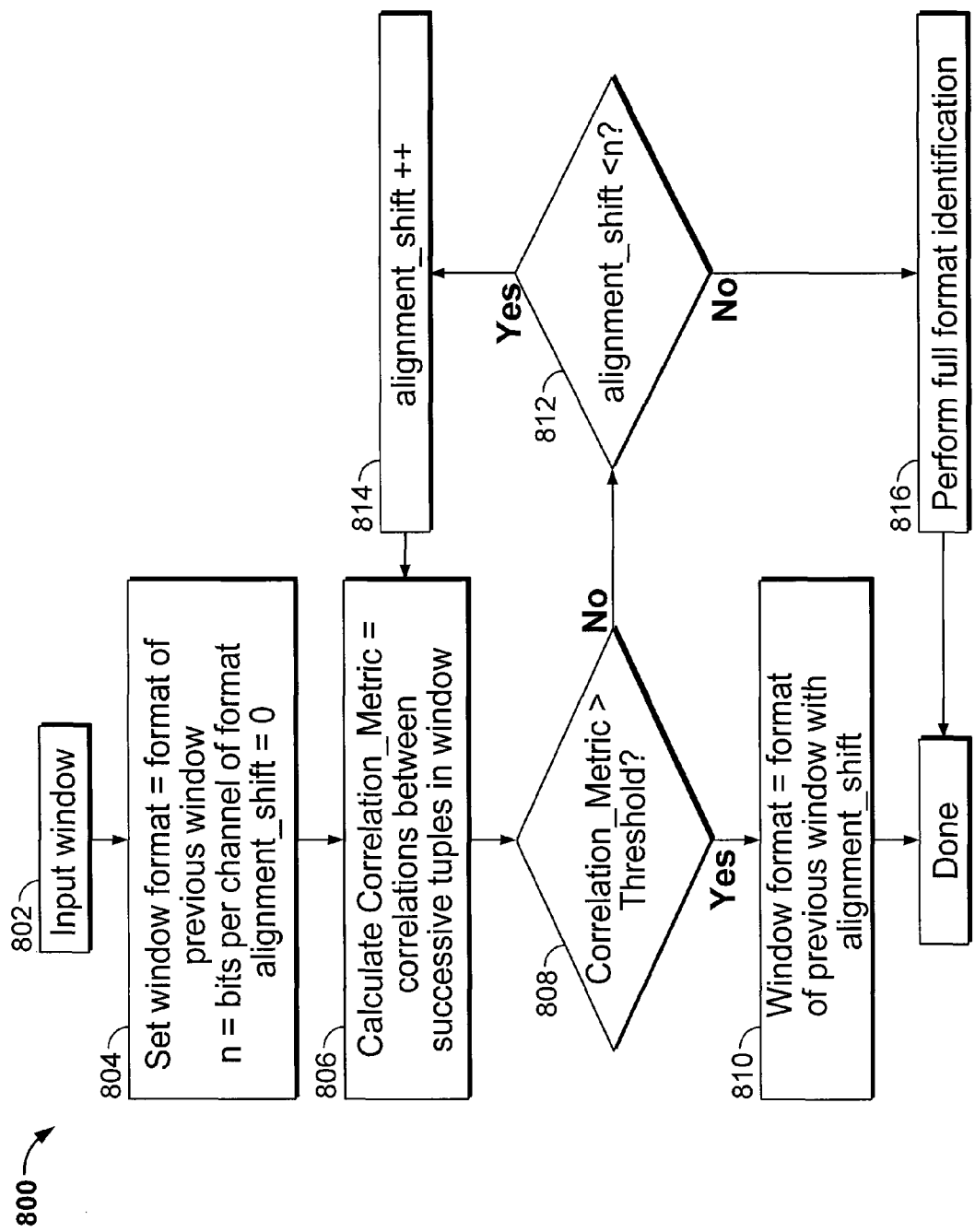
FIG. 8 illustrates an embodiment of a process for identifying the data format of an input window based on information about the identified format of the previous window.

FIG. 8 illustrates an embodiment of a process for identifying the data format of an input window based on information about the identified format of the previous window. In process 800 of FIG. 8, steps 802-810 determine whether the format for the previous window applies to the current one. Steps 812-814 may additionally be employed to determine whether the same format applies with an alignment shift. If both of the aforementioned tests fail, the full format identification process is initiated for the current window at step 816.

An example method to check if the data format of a (possibly shifted) previous window applies to a current window is next described. This check may be completed by measuring the correlation between the bit statistics. Let t be the tuple width determined for the previous window. As defined earlier, for position i within a tuple, let $p_i$ denote the fraction of times the bit in position i is different for two consecutive tuples of the previous window. Similarly, let q denote the fraction of times the bit in position i is different for two consecutive tuples of the current window. p and q are vectors of length w. In order to measure the correlation between them, $$\text{correlation}(p, q) = \sum_{i=1}^{t} g(p_i, q_i)$$

is computed where g( ) is an appropriately chosen function. For example, g( ) could be chosen so as to give higher weight to matching entries of p and q with values close to 0 corresponding to MSB positions. For example, the function $$g(p_i, q_i) = \frac{1}{p_i q_i} \text{ or } g(p_i, q_i) = \log\left(\frac{1}{p_i}\right)\log\left(\frac{1}{q_i}\right)$$

could be used. In some cases, a shifted format of the previous window applies to the current window. A shift of s rotates the bit statistics vector p by s positions, producing a new vector $p' = (p_{s+1}, p_{s+2}, \ldots, p_t, p_1, \ldots, p_s)$. In such cases, correlation(p',q) is computed.

Data Model Fitting—Handling Unknown Windows

As mentioned previously, unknown windows (i.e., windows for which low confidence scores were determined during the process of layout transform and tuple size determination) may be found. An example technique used to infer the format of unknown windows using the determined format information of adjacent windows is next described.

Consider an unknown window where the windows before and after it have high confidence scores. Let $t_1$ and $t_2$ be the determined tuple sizes for the windows before and after, respectively. Let p and q be the bit statistics vectors for the windows before and after, respectively. Note that p is a vector of length $t_1$, and q is a vector of length $t_2$. For the unknown window, compute two sets of statistics: p' corresponding to the format of the previous window and q' corresponding to the format of the next window. For every position x in the unknown window, let p'[a,b] denote the bit statistics in the unknown window in positions a through b corresponding to the format of the previous window and let q'[a,b] denote the bit statistics in the unknown window in positions a through b corresponding to the format of the next window. A breakpoint b is found such that the bit statistics in the unknown window from the beginning up to position b match those of the previous window, and the bit statistics in the unknown window from position b+1 until the end match the statistics of the next window. Mathematically, this is expressed as finding breakpoint b so as to maximize correlation(p, p'[1,b])+correlation(q, q'[b+1,L]). Alternately, the correlation terms in the expression may be weighted by the length of the interval in the unknown window that they represent, so that b should be chosen so as to maximize b*correlation(p, p'[1,b])+(L−)*correlation(q,q'[b+1,L]).

Figure 9:
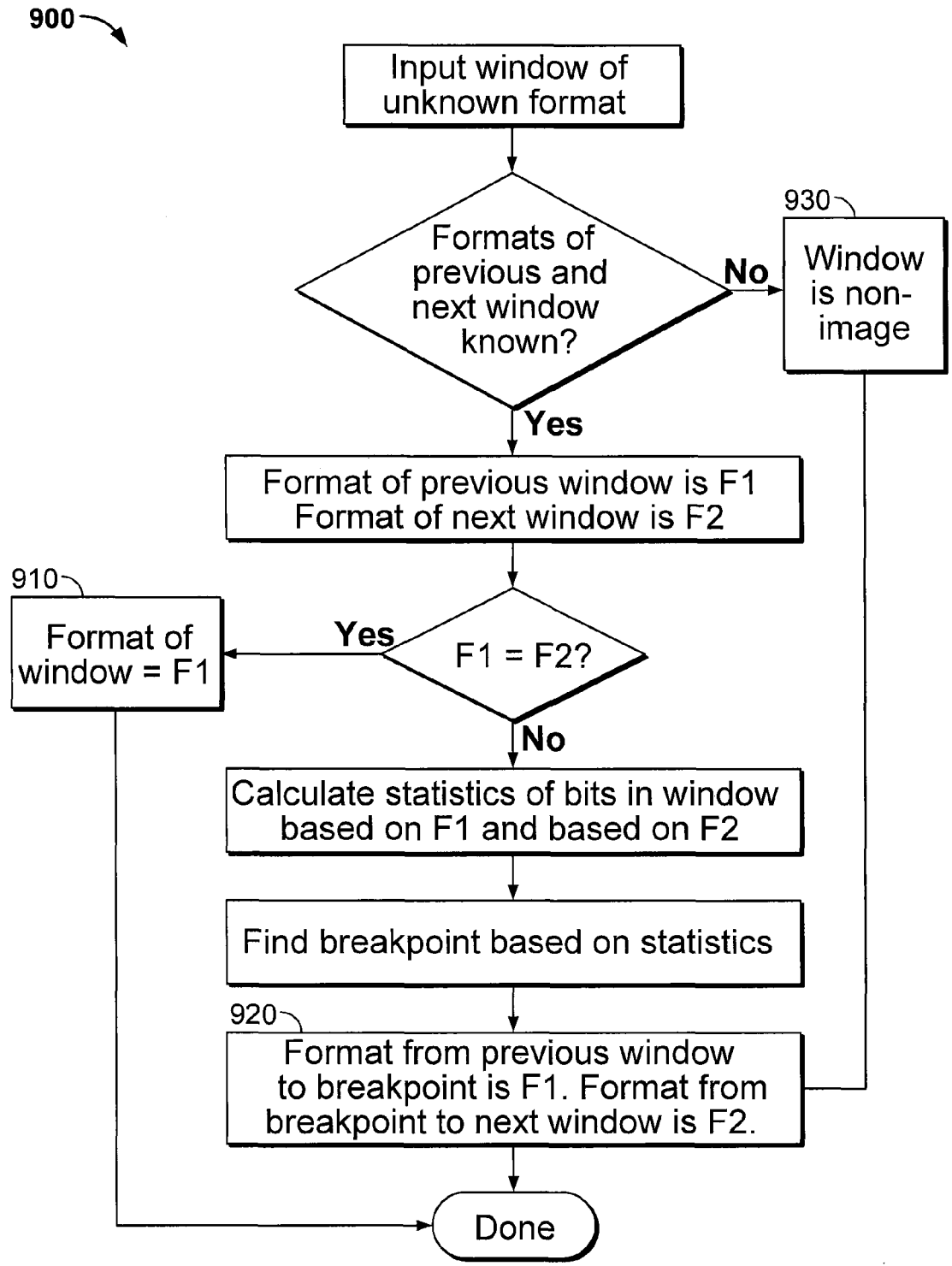
FIG. 9 illustrates an embodiment of a process for identifying the data format of an unknown window.

FIG. 9 illustrates an embodiment of a process for identifying the data format of an unknown window. For example, process 900 may be employed if previous tests to determine the format did not yield a result. In process 900, an input window of unknown format is either assigned the format(s) of the corresponding previous and/or next windows at steps 910 and 920, or it is determined at step 930 that the input window comprises non-image data.

Applications

Many applications exist for the described format identification techniques. Some applications are next described as examples. The described techniques are not limited to the given application examples but may similarly be employed with respect to any appropriate application.

Storage Systems

Storage systems can reduce their storage footprint by compressing their data segments or blocks. Most storage systems divide their files into data segments without knowing their data formats.

Figure 10:
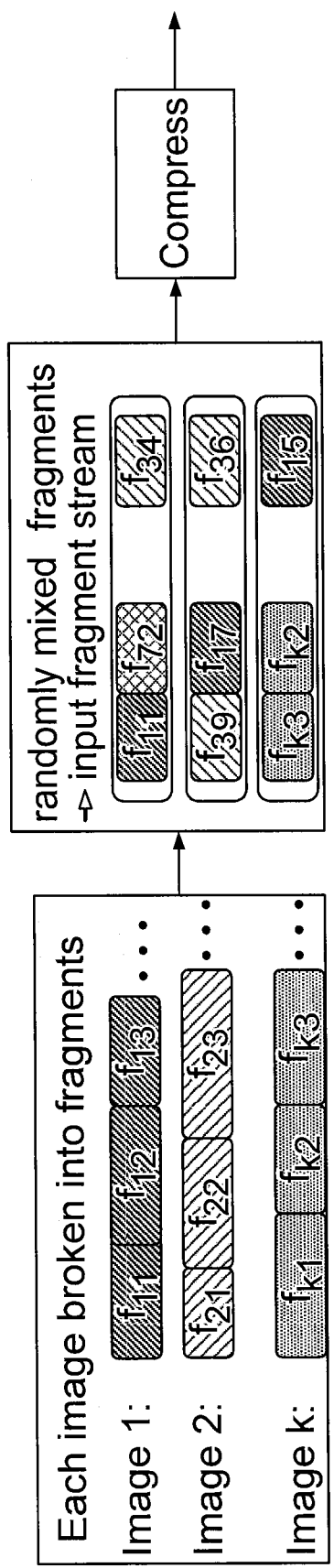
FIG. 10 illustrates a high-level view of an embodiment of a storage system that accepts fragmented data as input.
Figure 11:
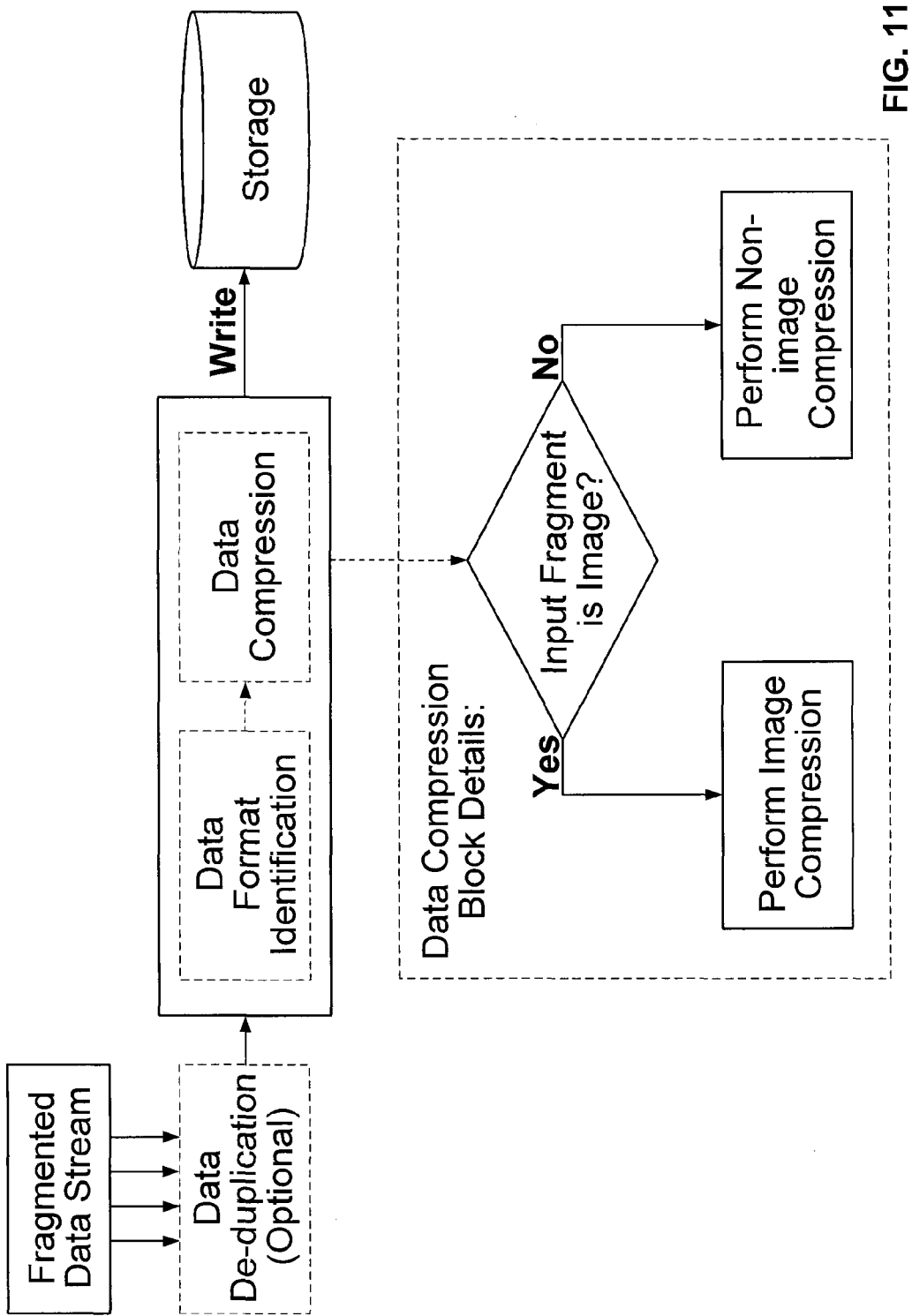
FIG. 11 illustrates an embodiment of a process in which data type recognition is employed during compression prior to writing to storage.
Figure 12:
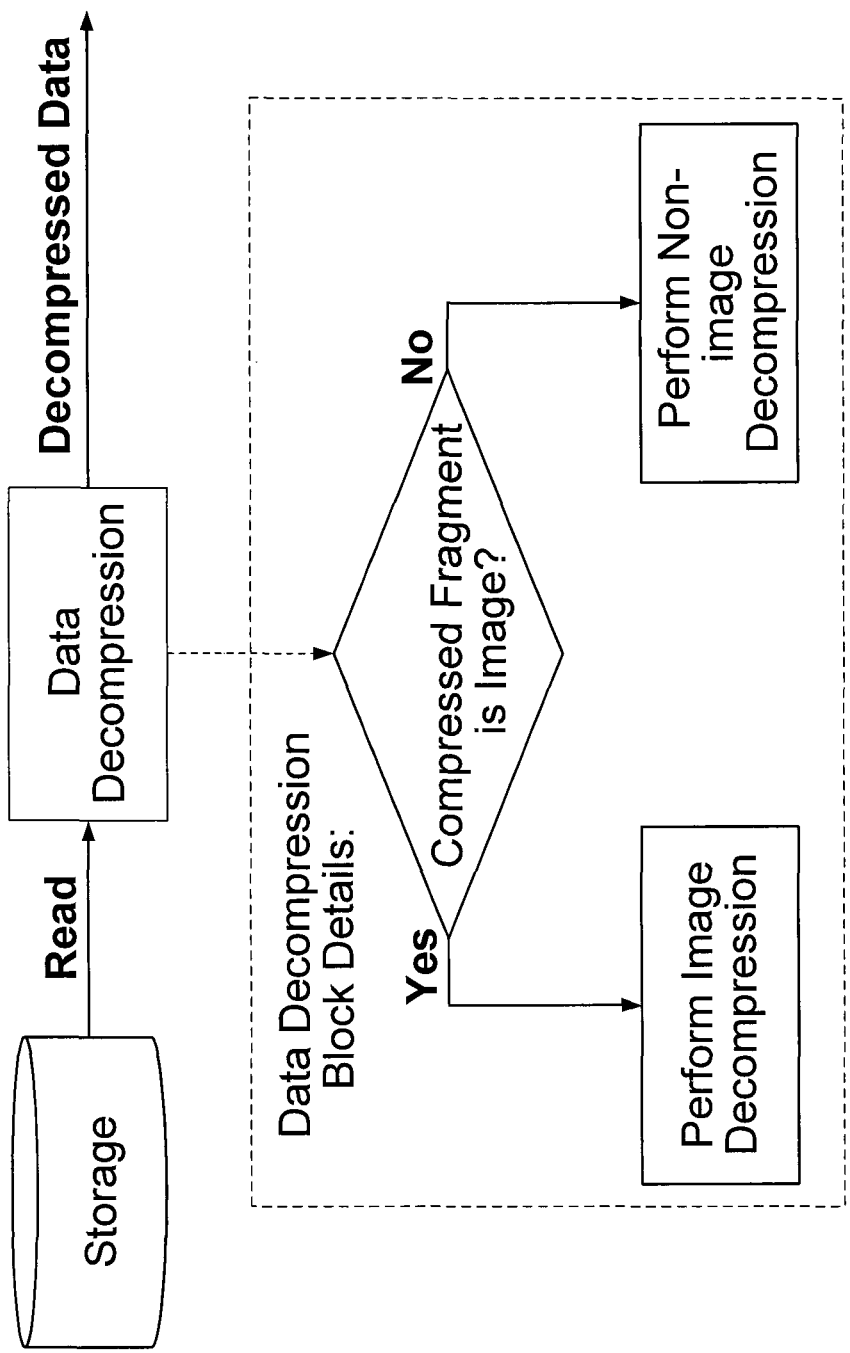
FIG. 12 illustrates an embodiment of a process in which data type recognition is employed during de-compression when reading from storage.

FIG. 10 illustrates a high-level view of an embodiment of a storage system that accepts fragmented data as input. As depicted, an input bundle is created by concatenating segments from different files. If the storage system performs data de-duplication, the data is subjected to de-duplication to remove redundant segments. The segments to be stored are then compressed. If a segment is part of an image, then certain compression methods that are tailored for such data may be applied to achieve more efficient compression. If a segment does not belong to an image, then it may be compressed by a general-purpose lossless compression technique such as LZ or GZIP. In order to facilitate this data-selective compression, it may be advantageous to first determine whether or not an input fragment is part of an image. The described techniques of format identification may be used to make this determination. FIG. 11 illustrates an embodiment of a process in which data type recognition is employed during compression prior to writing to storage while FIG. 12 illustrates an embodiment of a process in which data type recognition is employed during de-compression when reading from storage.

Communication Networks

Figure 13:
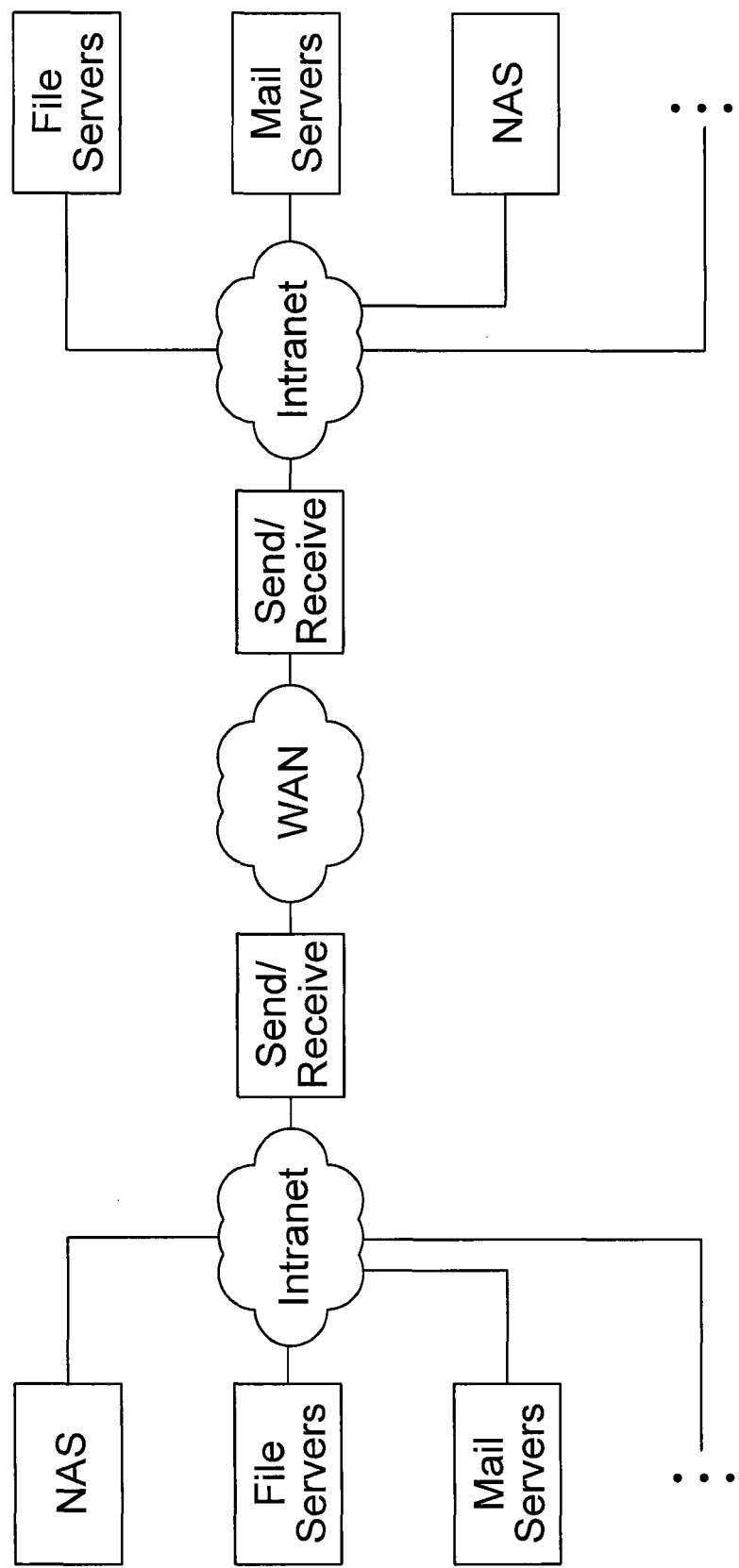
FIG. 13 illustrates an embodiment of a WAN environment.
Figure 14:
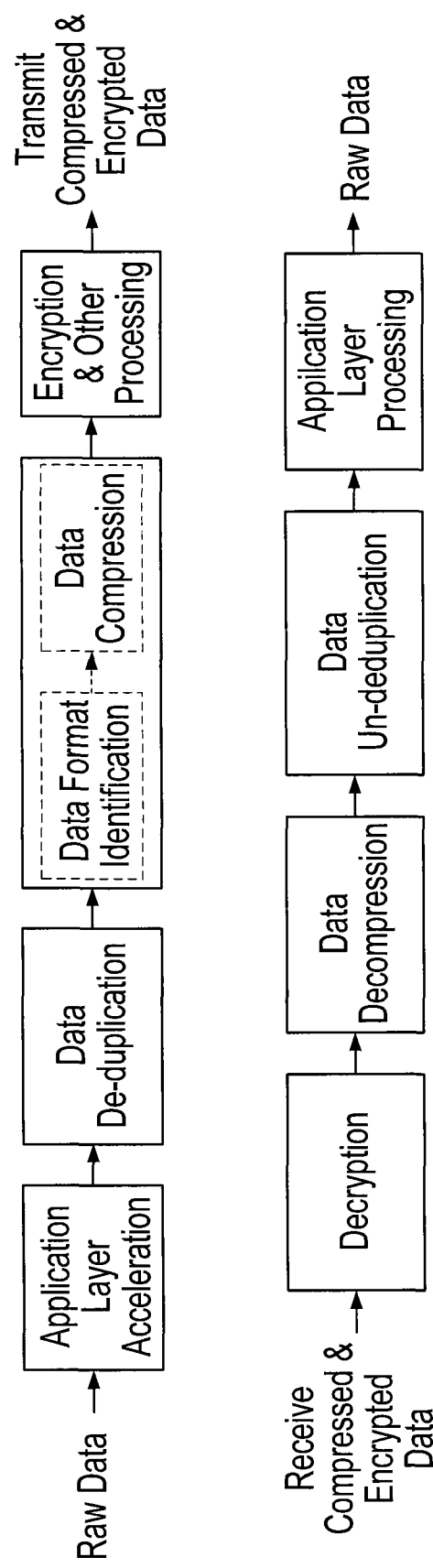
FIG. 14 illustrates embodiments of transmit and receive WAN optimization processes.

In order to use Wide Area Network (WAN) links to transfer data efficiently, enterprises have increasingly used WAN optimization appliances or software to transfer large data sets over network links with limited bandwidths. FIG. 13 illustrates an embodiment of a WAN environment. FIG. 14 illustrates embodiments of transmit and receive WAN optimization processes. WAN optimization reduces network traffic by using a compression algorithm to compress data segments before sending them over network links. When the compressed data segments arrive at their destination, the receiving WAN optimization appliance will decompress the data segments and recover the original data stream. Some WAN optimization products perform de-duplication at segment granularity to reduce data volume further. When the data segments belong to an image, a different set of compression techniques may be used for more efficient compression. The described techniques for format identification may be used to determine the nature of the data to be compressed. Thus high compression ratios can be achieved for image fragments, which directly impact the WAN performance and speed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for storing information, comprising:
   an interface that receives an input stream of information, wherein the input stream of information is divided into fragments;
   a data model generator that determines a data format for each fragment based on continuity properties of bits comprising each fragment, wherein the data model generator:
   transforms a physical layout of bits into a canonical layout of bits;
   determines a tuple size in the canonical layout that results in bits in successive tuples to be correlated;
   partitions bit positions in each tuple in the canonical layout into disjoint groups, wherein each group corresponds to a channel; and
   identifies data format based on the determined canonical layout, tuple size, and channel partitioning;
   a data compressor that compresses the input stream of information according to the identified data format of each fragment; and
   a memory that stores the compressed stream.

2. The system of claim 1, wherein the data format includes tuple size.

3. The system of claim 1, wherein the data format includes number of channels.

4. The system of claim 1, wherein the data format includes number of bits per channel.

5. The system of claim 1, wherein the data format includes a position of the most significant bit.

6. The system of claim 1, wherein for a subset of bit positions, the corresponding bits in consecutive tuples are examined and it is determined whether the joint distribution of the bits is far from being uniformly distributed.

7. The system of claim 1, wherein the stream of information is divided into windows.

8. The method of claim 7, wherein a size of at least one of the windows is determined based at least on part on whether the at least one window fits within a fragment of the data.

9. The system of claim 1, wherein the data model generator determines that a fragment does not contain image data when a confidence measure does not meet a threshold.

10. The system of claim 1, wherein bit positions within a channel are determined to be most significant based on lower variance than other bit positions.

11. The system of claim 1, wherein the stream of information corresponds to image data.

12. The method of claim 1, wherein the canonical layout has a repetitive structure.

13. The method of claim 12, wherein the data format is determined based at least in part on the repetitive structure of the canonical layout.

14. The method of claim 12, wherein the canonical layout is determined based at least in part on an endianness of a storage format of the data.

15. A method for storing information, comprising:
   receiving an input stream of information, wherein the input stream of information is divided into fragments;
   determining a data format for each fragment based on continuity properties of bits comprising each fragment, including by:
   transforming a physical layout of bits into a canonical layout of bits;
   determining a tuple size in the canonical layout that results in bits in successive tuples to be correlated;

partitioning bit positions in each tuple in the canonical layout into disjoint groups, wherein each group corresponds to a channel; and identifying data format based on the determined canonical layout, tuple size, and channel partitioning;

compressing the input stream of information according to the identified data format of each fragment; and storing the compressed stream.

16. The method of claim 15, wherein the data format includes tuple size.

17. The method of claim 15, wherein the data format includes number of channels.

18. The method of claim 15, wherein the data format includes number of bits per channel.

19. The method of claim 15, wherein the data format includes a position of the most significant bit.

20. The method of claim 15, wherein for a subset of bit positions, the corresponding bits in consecutive tuples are examined and it is determined whether the joint distribution of the bits is far from being uniformly distributed.

21. The method of claim 15, wherein the stream of information is divided into windows.

22. The method of claim 15, wherein bit positions within a channel are determined to be most significant based on lower variance than other bit positions.

23. The method of claim 15, wherein the stream of information corresponds to image data.

24. A computer program product embodied in a non-transitory computer readable storage medium and comprising computer instructions for:

receiving an input stream of information, wherein the input stream of information is divided into fragments;

determining a data format for each fragment based on continuity properties of bits comprising each fragment, including by:

transforming a physical layout of bits into a canonical layout of bits;

determining a tuple size in the canonical layout that results in bits in successive tuples to be correlated;

partitioning bit positions in each tuple in the canonical layout into disjoint groups, wherein each group corresponds to a channel; and identifying data format based on the determined canonical layout, tuple size, and channel partitioning;

compressing the input stream of information according to the identified data format of each fragment; and storing the compressed stream.

* * * * *